US012594949B2

(12) United States Patent
Morimoto et al.

(10) Patent No.: US 12,594,949 B2
(45) Date of Patent: Apr. 7, 2026

(54) NOTIFICATION DEVICE, NOTIFICATION METHOD, AND NONTRANSITORY RECORDING MEDIUM PROVIDED WITH COMPUTER PROGRAM FOR NOTIFICATION DEVICE

(71) Applicants:TOYOTA JIDOSHA KABUSHIKI KAISHA, Toyota (JP); AISIN CORPORATION, Kariya (JP)

(72) Inventors: Hiroshi Morimoto, Tokyo-to (JP); Takuhiro Omi, Anjo (JP); Udara Eshan Manawadu, Tokyo-to (JP); Kenta Yamada, Tokyo-to (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 180 days.

(21) Appl. No.: 18/537,932

(22) Filed: Dec. 13, 2023

(65) Prior Publication Data

US 2024/0308535 A1    Sep. 19, 2024

(30) Foreign Application Priority Data

Mar. 14, 2023    (JP) ................................ 2023-039538

(51) Int. Cl.
B60W 50/14        (2020.01)
B60W 60/00        (2020.01)
(52) U.S. Cl.
CPC ............ B60W 50/14 (2013.01); B60W 60/00 (2020.02)
(58) Field of Classification Search
None
See application file for complete search history.

(56) References Cited

U.S. PATENT DOCUMENTS

2017/0028987 A1    2/2017  Yamada
2017/0315556 A1   11/2017  Mimura et al.
2017/0371334 A1*  12/2017  Nagy ................ B60W 60/0057
2020/0269849 A1*   8/2020  Kang ................... G06V 20/597

FOREIGN PATENT DOCUMENTS

JP        2017024653 A    2/2017
JP        2017200786 A   11/2017
JP        2019079151 A    5/2019
WO        2019/167257 A1   9/2019

OTHER PUBLICATIONS

Espacenet English Translation of WO2019167257A1 (Year: 2019).*
Merged PE2E English Translation and Foreign FR 3065139 A1 (Year: 2017).*

* cited by examiner

*Primary Examiner* — James J Lee
*Assistant Examiner* — Andrew Sang Kim
(74) *Attorney, Agent, or Firm* — Dickinson Wright, PLLC

(57)        ABSTRACT

A notification device is provided with an output device configured to notify information to a driver of a vehicle and a control device configured to control the output device. The control device detects behavior of the driver based on driver data expressing the state of the driver, calculates a score showing a degree by which the driver is relaxing based on the behavior of the driver, notifies the score, calculated based on behavior of the driver during automated driving by which driving operations of the vehicle are automatically performed, through the output device when a predetermined timing is reached, and does not notify the score when a predetermined condition stands even when the predetermined timing is reached.

6 Claims, 6 Drawing Sheets

NOTIFICATION DEVICE, NOTIFICATION METHOD, AND NONTRANSITORY RECORDING MEDIUM PROVIDED WITH COMPUTER PROGRAM FOR NOTIFICATION DEVICE

FIELD

The present disclosure relates to a notification device, notification method, and nontransitory recording medium provided with a computer program for a notification device.

BACKGROUND

WO2020/167257 discloses a conventional notification system configured to use information relating to movement of an occupant of a vehicle when the vehicle is running by automated driving so as to calculate a degree of relaxation of that occupant and to notify the degree of relaxation after the automated driving ends.

SUMMARY OF DISCLOSURE

In the above-mentioned conventional notification system, the degree of relaxation is always notified after automated driving ends, but sometimes it is preferable to not notify the degree of relaxation.

The present disclosure was made focusing on such a problem and has as its object to not notify the degree of relaxation of a driver of a vehicle unless necessary when the vehicle is running by automated driving.

The gist of the present disclosure is as follows:

(1) A notification device comprising an output device configured to notify information to a driver of a vehicle and a control device configured to control the output device, wherein the control device is configured to detect behavior of the driver based on driver data expressing the state of the driver, calculate a score showing a degree by which the driver is relaxing based on the behavior of the driver, notify the score, calculated based on behavior of the driver during automated driving by which driving operations of the vehicle are automatically performed, through the output device when a predetermined timing is reached, and not notify the score when a predetermined condition stands even when the timing is reached.

(2) The notification device according to the above (1), wherein the predetermined condition is that the score be higher than a predetermined notification upper limit value.

(3) The notification device according to the above (1) or (2), wherein the predetermined condition is that the number of times of running on a road run on by automated driving for calculating the score be less than a predetermined number of times.

(4) The notification device according to any one of the above (1) to the above (3), wherein the predetermined condition is that the number of times of utilization of automated driving by the driver is less than a predetermined number.

(5) The notification device according to any one of the above (1) to the above (4), wherein the timing is a predetermined time period before a scheduled time of end of automated driving.

(6) The notification device according to any one of the above (1) to the above (4), wherein the timing is during automated driving or when stopping the vehicle after the end of automated driving.

(7) The notification device according to any one of the above (1) to the above (4), wherein the timing is before the start or at the time of start of automated driving when next running by automated driving on a road run on by automated driving for calculating the score.

(8) A notification method by a notification device for notifying information to a driver of a vehicle through an output device, which notification method comprising detecting behavior of the driver based on driver data expressing the state of the driver, calculating a score showing a degree by which the driver is relaxing based on the behavior of the driver, notifying the score, calculated based on behavior of the driver during automated driving by which driving operations of the vehicle are automatically performed, through the output device when a predetermined timing is reached, and not notifying the score when a predetermined condition stands even when the timing is reached.

(9) A nontransitory recording medium provided with a computer program for a notification device for notifying information to a driver of a vehicle through an output device, the nontransitory recording medium provided with a computer program for a notification device making the notification device detect behavior of the driver based on driver data expressing the state of the driver, calculate a score showing a degree by which the driver is relaxing based on the behavior of the driver, notify the score, calculated based on behavior of the driver during automated driving by which driving operations of the vehicle are automatically performed, through the output device when a predetermined timing is reached, and not notify the score when a predetermined condition stands even when the timing is reached.

According to these aspects of the present disclosure, it is possible to not notify the degree of relaxation of a driver of a vehicle unless necessary when the vehicle is running by automated driving.

DESCRIPTION OF EMBODIMENT

Figure 1:
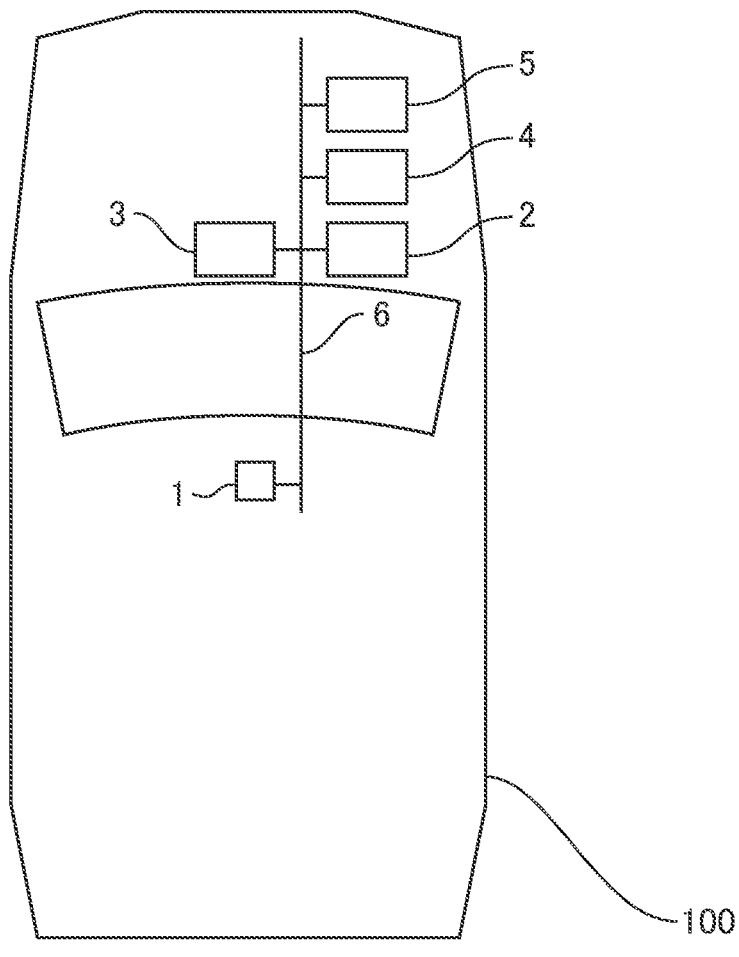
FIG. 1 is a schematic view of the system of a vehicle according to one embodiment of the present disclosure.

Below, referring to the drawings, an embodiment of the present disclosure will be explained in detail. Note that, in the following explanation, similar component elements are assigned the same reference notations.

FIG. 1 is a schematic view of the system of a vehicle 100 according to an embodiment of the present disclosure.

The vehicle 100 is provided with a surrounding sensor 1, driver sensor 2, output device 3, storage device 4, and control device 5. The surrounding sensor 1, driver sensor 2, output device 3, storage device 4, and control device 5 are respectively connected to be able to communicate through an internal vehicle network 6 based on a standard such as a Controller Area Network.

The surrounding sensor 1 is a sensor for generating surrounding data expressing the state of the surroundings of the vehicle 100. In the present embodiment, as the surrounding sensor 1, one or more external cameras are provided for capturing the surroundings of the vehicle 100. An external camera captures the surroundings of the vehicle 100 by a predetermined frame rate (for example, 10 Hz to 40 Hz) and generates a surrounding image in which the surroundings of the vehicle 100 are shown. An external camera 11 sends the generated surrounding image as surrounding data to the control device 5 each time generating a surrounding image.

Note that instead of an external camera or in addition to an external camera, a distance measuring sensor for measuring the distance to a vehicle, pedestrian, or other object present in the surroundings of the vehicle 100 may be provided as a surrounding sensor 1. As examples of the distance measuring sensor, for example, a lidar (light detection and ranging) device for emitting laser light and measuring the distance based on its reflection, millimeter wave radar sensor for emitting an electrical wave and measuring the distance based on its reflection, etc. may be mentioned.

The driver sensor 2 is a sensor for generating driver data expressing the state of the driver. In the present embodiment, as the driver sensor 2, a driver monitor camera is provided for capturing an appearance of the driver including the face. The driver monitor camera captures the appearance of the driver by a predetermined frame rate (for example, 10 Hz to 40 Hz) and generates an image of the appearance in which the appearance of the driver is shown. The driver monitor camera sends the generated image of the appearance as driver data to the control device 5 every time generating an image of the appearance of the driver.

The output device 3 is a device for notifying the driver through a dynamic sense of the driver of the vehicle 100 (for example, vision, hearing, touch, etc.) In the present embodiment, as the output device 3, a display (for example, instrument display, center display, heads up display, etc.) arranged at a position which the driver can view and a speaker are provided. The display shows information corresponding to a display signal output from the control device 5 (for example, text information or graphic information). The speaker outputs sound corresponding to an audio signal output from the control device 5.

The storage device 4 has an HDD (hard disk drive) or SSD (solid disk drive), nonvolatile semiconductor memory, or other storage medium and stores a high definition map. The high definition map includes various road information required for performing automated driving of the automated driving level 3. The "automated driving of the automated driving level 3" is automated driving where all of the dynamic driving tasks comprised of recognition, judgment, and operation are performed by the control device 5 in a limited region satisfying predetermined driving environment conditions.

Figure 2:
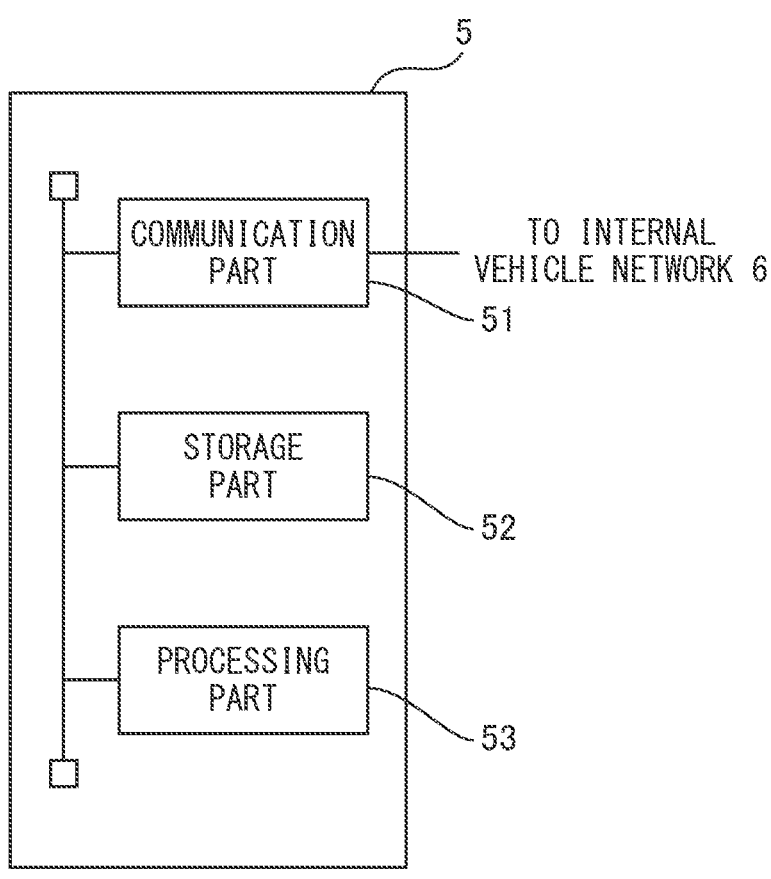
FIG. 2 is a view showing a hardware configuration of a control device.

The control device 5 is an ECU (electronic control unit) provided with a communication part 51, storage part 52, and processing part 53 (see FIG. 2). The control device 5 receives as input, in addition to the above-mentioned surrounding data and driver data, the various types of data required for performing automated driving of the automated driving level 3 (for example, vehicle position data acquired by a distance measurement sensor, vehicle speed data acquired by a vehicle speed sensor, etc.) The control device 5 performs automated driving of the automated driving level 3 based on these input data and high definition map. While automated driving of the automated driving level 3 is being performed, the driver can perform tasks other than driving (for example, operation of smart phones, relaxing, etc.)

Further, the control device 5, as necessary, sends a display signal and audio signal to the output device 3 and sends various notifications through the output device 3 to the driver. In this way, in the present embodiment, a notification device is formed by the output device 3 and the control device 5.

FIG. 2 is a view showing a hardware configuration of the control device 5.

The control device 5 is provided with a communication part 51, storage part 52, and processing part 53.

The communication part 51 is provided with an interface circuit for connecting the control device 5 to the internal vehicle network 6. The communication part 51 supplies data received from the outside (surrounding data, driver data, etc.) to the processing part 53. Further, the communication part 51 outputs a display signal output from the processing part 53 to an information display screen 31.

The storage device 52 has an HDD (hard disk drive) or SSD (solid disk drive), semiconductor memory, or other storage medium and stores various computer programs used for processing at the processing part 53.

The processing part 53 has one or more CPUs (central processing units) and their peripheral circuits. The processing part 53 runs various computer programs stored in the storage part 52 and, for example, is a processor.

Here, as explained above, while automated driving of the automated driving level 3 is being performed by the control device 3, the driver can perform tasks other than driving. On the other hand, for example, if running outside the range of the high precision map, if the surrounding sensor 1, driver sensor 2, etc. malfunctions, or otherwise the predetermined running environment conditions for automated driving of the automated driving level 3 are no longer satisfied, the control device 5 requests the driver through the output device 3 to take over at least part of the dynamic driving tasks. At this time, if the driver cannot quickly take over the dynamic driving tasks, safe running of the vehicle 100 becomes difficult.

For this reason, depending on the driver, even while automated driving of the automated driving level 3 is being performed, the driver may conceivably feel uneasy about automated driving, be constantly monitoring the surroundings, and otherwise be unable to relax. If this is so, the benefits of automated driving will be unable be fully enjoyed.

Therefore, for example, by calculating a score showing a degree of relaxation of the driver (below, referred to as the "relax score") based on the behavior of the driver while automated driving is being performed and notifying the relax score at a predetermined timing to the driver, it is possible to let a driver with a low relax score know that he may relax due to the automated driving being underway (for example, may decrease the number of times of monitoring the surroundings etc.)

However, if allowed to relax too much during automated driving, for example, time is liable to be required for the driver to focus and otherwise dynamic driving tasks are liable to be unable to be quickly taken over. That is, it is not necessarily true that the higher the relax score, the better. Therefore, in the present embodiment, when the relax score becomes greater than or equal to a predetermined threshold value or more, the relax score is made to not be notified.

Due to this, it is possible to notify the relax score to a driver with a low relax score to prompt him to suitably relax.

Note that, in a region where the relax score becomes greater than or equal to a predetermined threshold value, it is also possible to conversely lower the relax score to be notified to the driver and keep the driver from relaxing too much during automated driving, but if the relax score is low regardless of being in an extremely relaxed state, confusion will be invited and, further, the confidence of the driver in the relax score will be liable to fall. For this reason, in the present embodiment, as explained above, the relax score is made to not be notified when the relax score becomes greater than or equal to a predetermined threshold value.

Figure 3:
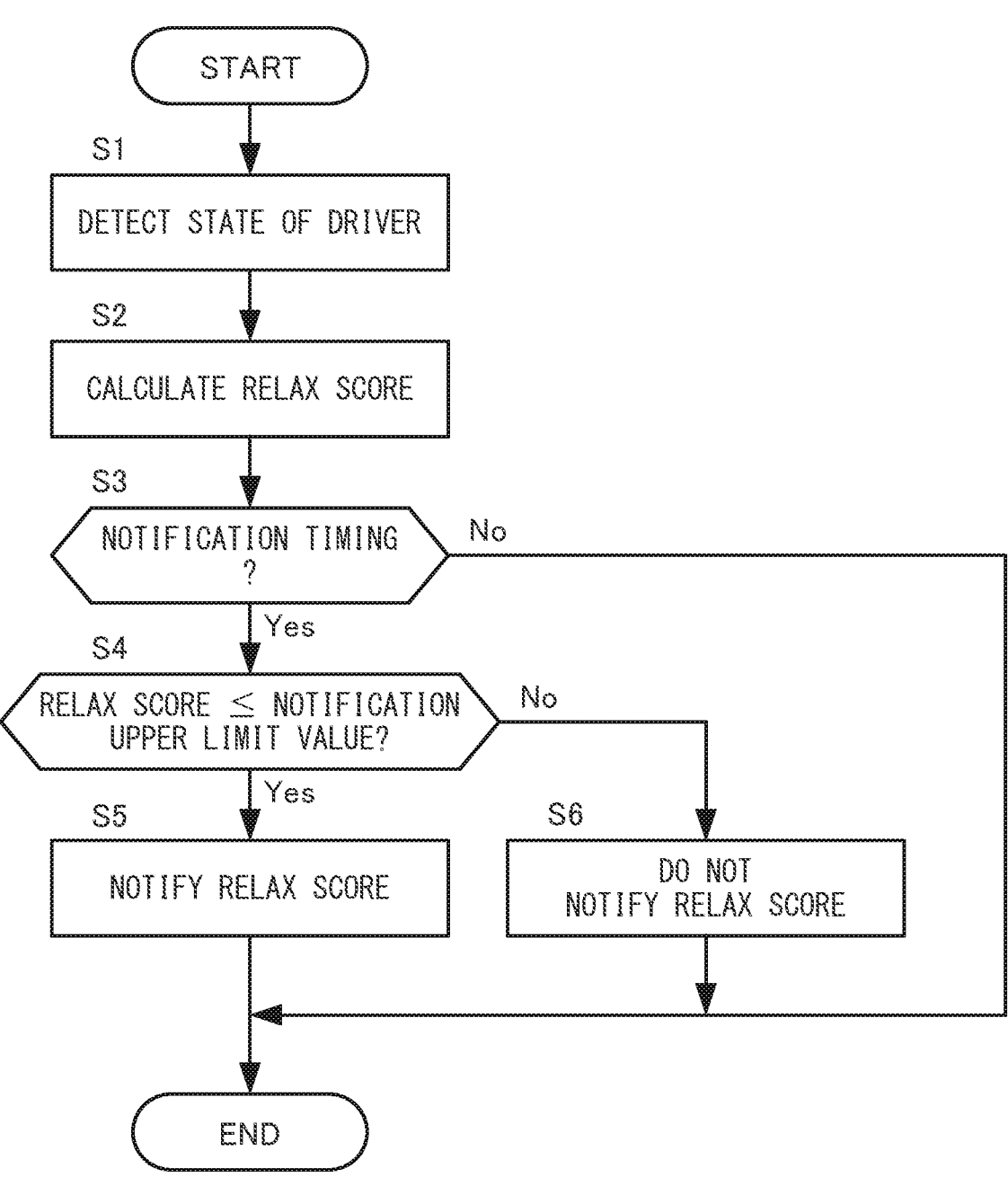
FIG. 3 is a flow chart for explaining details of processing for notification of a relax score run at a processing part of the control device.

Below, referring to FIG. 3, details of the processing for notification of the relax score of one example of the processing performed at the processing part 53 of the control device 5 will be explained. FIG. 3 is a flow chart for explaining details of the processing for notification of the relax score.

At step S1, the control device 5 detects the state of the driver based on the driver data received from the driver sensor 2, specifically the image of the appearance of the driver received from the driver monitor camera. In the present embodiment, the control device 5 successively inputs images of the appearance of the driver received from the driver monitor camera into a classifier and detects the positions of predetermined parts of the driver such as his hands or head, the facial orientation of the driver, the state of the driver's seat, and the types and positions of objects present in the surroundings of the driver's seat along with time to thereby detect the behavior of the driver. The classifier, for example, can be made a convolutional neural network (CNN) having a plurality of convolutional layers connected in series from the input side to the output side. Further, the control device 5 detects changes in the color of skin caused by changes of the blood flow at predetermined parts of the driver detected along with time to thereby detect a heartbeat (pulse) of the driver.

Note that in the present embodiment, as the state of the driver, the behavior of the driver and the heartbeat of the driver are detected, but it is also possible to detect either of them as the state of the driver.

At step S2, the control device 5 calculates the relax score of the driver based on the state of the driver while automated driving is being performed. In the present embodiment, the control device 5 respectively calculates a posture change score calculated in accordance with a change of posture of the driver during automated driving, a reclining score calculated in accordance with a reclining degree of the driver's seat during automated driving, and a heartbeat score calculated in accordance with the heartbeat of the driver during automated driving and calculates the average of these three scores as the relax score.

The control device 5 calculates the posture change score by first calculating the number of times of change of posture based on the behavior of the driver in a predetermined time period during which automated driving is being performed (below, referred to as the "score calculation time period").

In calculating the posture change score, the control device 5 first calculates the number of times the amount of change of the head position of the driver in for example 1 second in a score calculation time period becomes greater than or equal to a predetermined threshold value as the number of times of change of posture. The control device 5 next calculates the average value of the number of times of change of posture in the score calculation time period (number of times of change of posture per unit time) and calculates the posture change score referring to the posture change score graph of FIG. 4 based on the average value of the number of times of change of posture.

Figure 4:
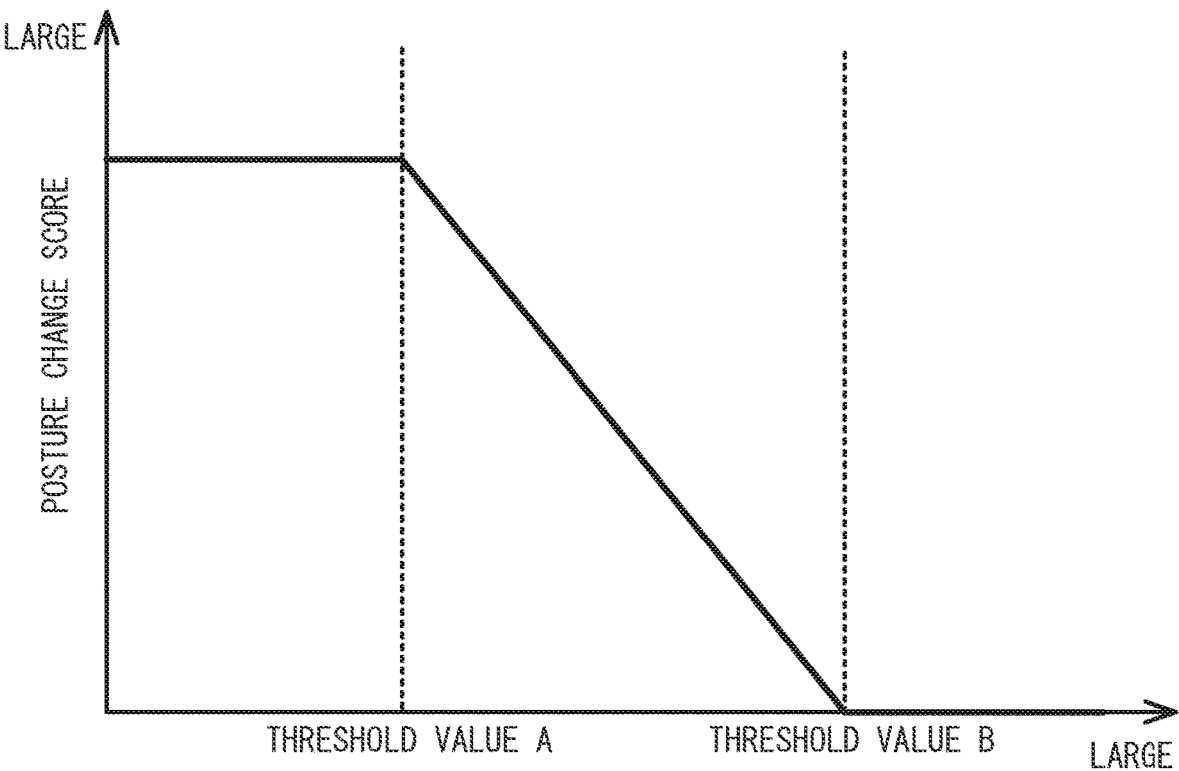
FIG. 4 is a view showing a posture change score graph.

The posture change score graph of FIG. 4 is in the end one example, but by the posture change score, basically it is possible to judge that the driver is relaxing more when the average value of the number of times of the change of posture is small compared to when it is large, so the score becomes high. In FIG. 4, the threshold value A can be made 0 or the average value of the number of times of change of posture envisioned from the running vibration and the threshold value B can be made the average value of the number of times of the change of posture at the time of manual driving.

Figure 5:
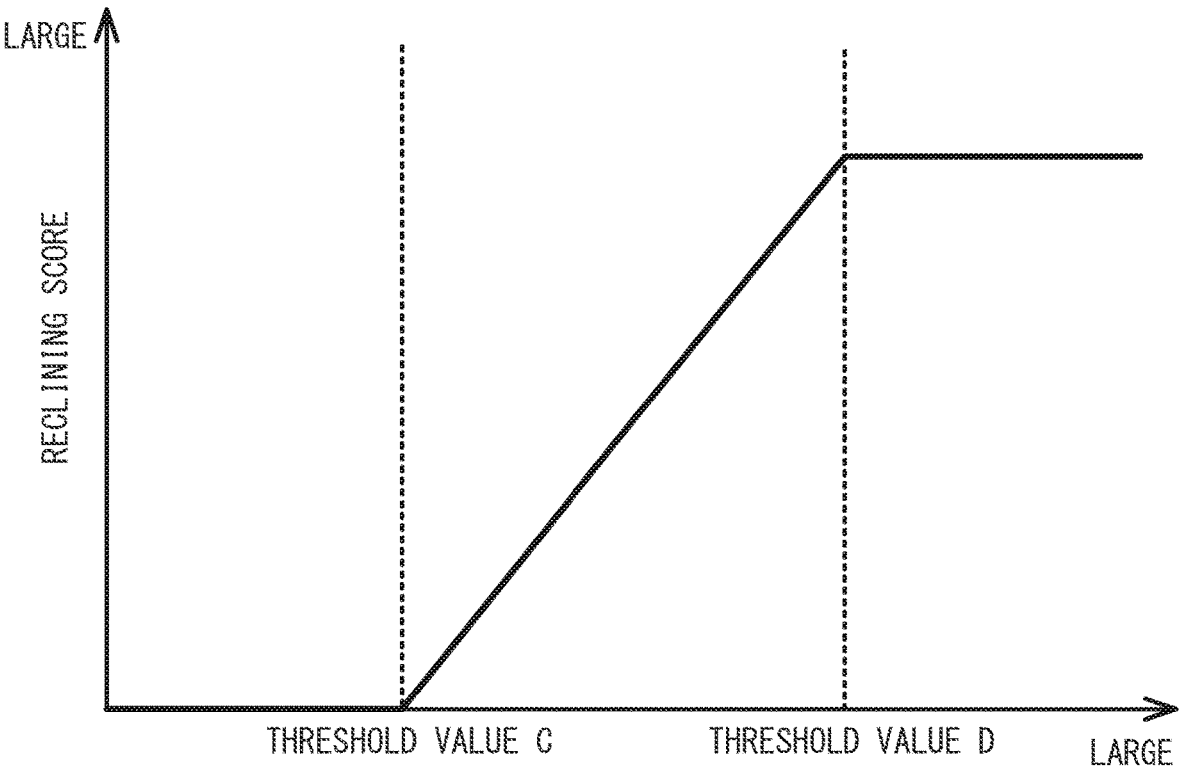
FIG. 5 is a view showing a reclining score graph.

Further, in calculating the reclining score, the control device 5 calculates the average value of the reclining angle at the score calculation time period based on the state of the driver's seat and refers to the reclining score graph of FIG. 5 to calculate the reclining score based on the average value of the reclining angle.

The reclining score graph of FIG. 5 is also in the end one example, but by the reclining score, basically it is possible to judge that the driver is relaxed more when the average value of the reclining angle is large compared with when it is small, so the result becomes a high score. In FIG. 5, the threshold value C, for example, can be made 90 degrees or the minimum angle settable. The threshold value D can be made the maximum angle settable.

Figure 6:
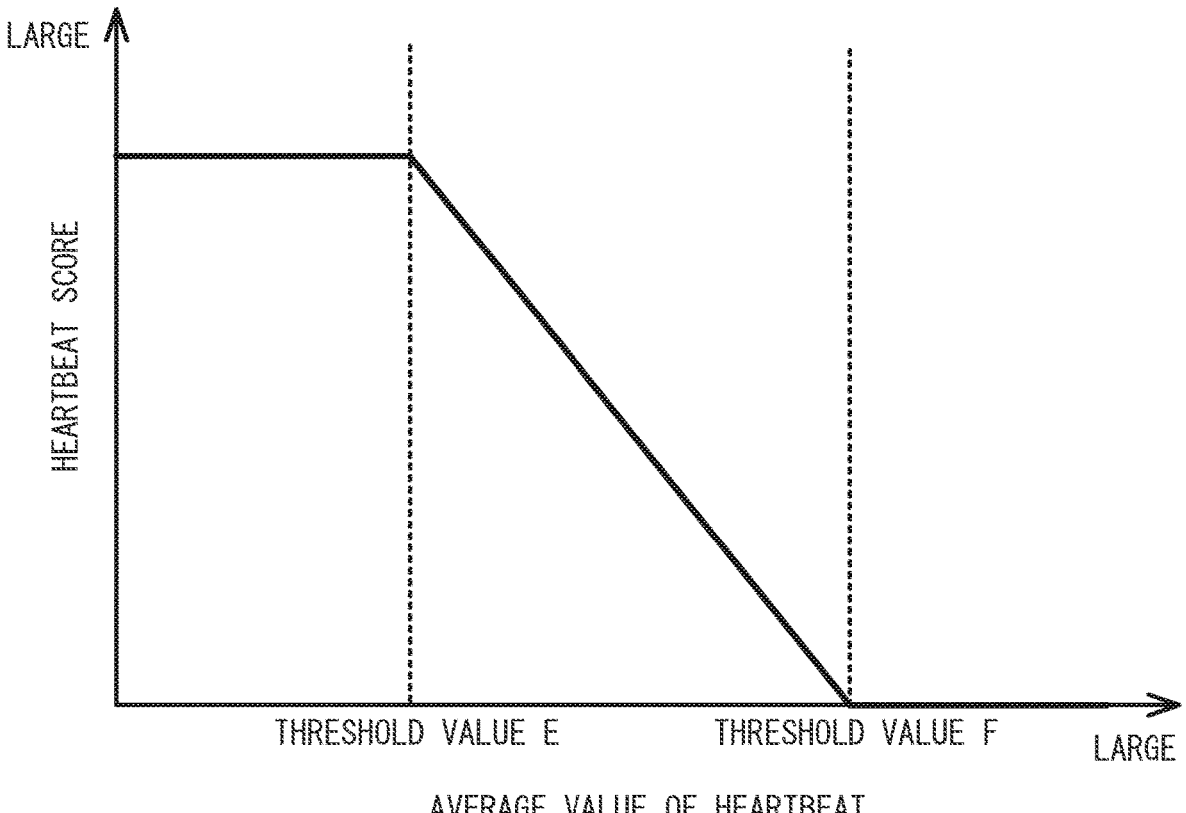
FIG. 6 is a view showing a heartbeat score graph.

Further, in calculating the heartbeat score, the control device 5 calculates the average value of the heartbeat in the score calculation time period and refers to the heartbeat score graph of FIG. 6 based on the average value of the heartbeat to calculate the heartbeat score.

The heartbeat graph of FIG. 6 is also in the end one example, but by the heartbeat score, basically it can be judged that the driver is relaxing more when the heartbeat is large compared to when it is small, so the score becomes higher. In FIG. 6, the threshold value E can, for example, be made the value of the average heartbeat at the time of manual driving minus exactly a predetermined number. The threshold value F can be made the average heartbeat at the time of manual driving.

At step S3, the control device 5 judges whether the timing for notification of the relax score has been reached. The control device 5 proceeds to the processing of step S4 if the timing for notification of the relax score has been reached. On the other hand, the control device 5 ends the current processing if the timing for notification of the relax score has not been reached.

Note that the score calculation time period of the time period for calculating the relax score during automated driving can be simply made the time period from when automated driving is started to when that automated driving is ended. In this case, the timing of notification can be made a suitable timing after ending automated driving of the automated driving level 3. For example, it is possible to notify information to the driver at the time of stopping the vehicle when the driver is performing at least part of the dynamic driving tasks after ending the automated driving. Further, for example, it is possible to notify information to the driver before starting or when starting automated driving at the time of next running on the same road as the present time.

Further, the score calculation time period, for example, may be made the time period from when automated driving is started to a predetermined time period before a scheduled time of end of the automated driving if a geographical point outside the range of a high precision map or other point where automated driving has to be ended is known in advance. In this case, the timing of notification may be made any timing until the automated timing currently being performed is ended.

Further, the score calculation time period, for example, may be made a preset predetermined time period. In this case, during the automated driving, it is possible to calculate the relax score every predetermined time period, so it is also possible to periodically notify the relax score every time calculating the relax score. That is, during automated driving, it is also possible to notify the relax score every time a predetermined time period elapses.

At step S4, the control device 5 judges whether the relax score is less than or equal to a predetermined notification upper limit value. The control device 5 proceeds to the processing of step S5 if the relax score is less than or equal to the notification upper limit value. On the other hand, the control device 5 proceeds to the processing of step S6 if the relax score is higher than the notification upper limit value.

At step S5, the control device 5 notifies the relax score to the driver through the output device 3.

At step S6, the control device 5 is made to not notify the relax score.

The notification device according to the present embodiment explained above is provided with the output device 3 for notifying the driver of the vehicle and the control device 5 for controlling the output device 3. Further, the control device 5 is configured to detect the behavior of the driver based on driver data expressing the state of the driver, calculate the relax score showing the degree by which the driver has relaxed based on the behavior of the driver, notify the relax score, calculated based on the behavior of the driver during automated driving in which driving operations of the vehicle 100 are automatically performed, through the output device 3 when a predetermined timing is reached, and not notify the relax score even when a predetermined timing is reached if a predetermined condition stands.

Due to this, for example, it is possible to not notify the relax score unless necessary when a condition under which notification of the relax score is not preferable stands.

In the present embodiment, the predetermined condition is made the relax score being higher than the notification upper limit value, so a driver with a low relax score can be notified of the relax score and be prompted to suitably relax. Further, a driver with a relax score higher than the notification upper limit value can be made to not be notified of the relax score, so it is possible to make it so that the driver is not excessively prompted to relax. Therefore, it is possible to keep the driver from ending up excessively relaxing, so it is possible to keep a driver from becoming unable to quickly take over dynamic driving tasks.

Note that the predetermined timing can, for example, be made a predetermined time period before a scheduled time of end of automated driving. Further, the predetermined timing, for example, can be made during automated driving or when the vehicle is stopped after the end of automated driving. Further, the predetermined timing, for example, can be made before starting or when starting automated driving when next running by automated driving on a road run on by automated driving for calculating the relax score.

Above, an embodiment of the present disclosure was explained, but the above embodiment only shows one of the examples of application of the present disclosure and is not intended to limit the technical scope of the present disclosure to the specific constitution of the embodiment.

For example, in the above embodiment, the relax score was made to not be notified when the relax score is higher than the notification upper limit value. However, the disclosure is not limited to this. For example, if going out of the way to notify a low relax score in a case where relaxing is naturally impossible, some drivers are liable to feel bothered, so in such a case as well, the relax score may be made to not be notified.

As a case where relaxing is naturally impossible, for example, a case where the road being currently run on by automated driving is a road first being run on or a road which has only been run on a few times may be mentioned. Therefore, to calculate the relax score, if the number of times of running on the road run on by automated driving is less than a predetermined number of times, it is also possible not to notify the relax score even when reaching a predetermined timing. In such a case, it is possible to notify the relax score only for roads which have been run on for greater than or equal to a predetermined number of times.

Further, as a case where relaxing is naturally impossible, for example, a case where the driver is first utilizing automated driving may be mentioned. Therefore, if the number of times of utilization of automated driving by a driver for whom the relax score has been calculated is less than a predetermined number of times, it is also possible to not notify the relax score even when a predetermined timing is reached. In such a case, it is possible to notify the relax score only for a driver who has utilized automated driving for greater than or equal to a predetermined number of times.

Further, in the above embodiment, the computer program run in the control device 5 (processing for notification of relax score) may be provided in a form recorded in a computer readable portable recording medium such as a semiconductor memory, magnetic recording medium, or optical recording medium.

The invention claimed is:

1. A notification device comprising:
a display or a speaker configured to notify information to a driver of a vehicle; and
a processor configured to control the display or speaker, wherein the processor is configured to:
detect behavior of the driver based on driver data expressing the state of the driver;
calculate a score showing a degree by which the driver is relaxing based on the behavior of the driver;
notify the score, calculated based on behavior of the driver during automated driving by which driving operations of the vehicle are automatically performed, through the output device when a predetermined timing is reached; and
not notify the score when a predetermined condition stands even when the timing is reached,
wherein the predetermined condition is at least one of the score be higher than a predetermined notification upper limit value, a number of times of running on a road run on by automated driving for calculating the score be less than a predetermined number of times, and a number of times of utilization of automated driving by the driver is less than a predetermined number.

2. The notification device according to claim 1, wherein the timing is a predetermined time period before a scheduled time of end of automated driving.

3. The notification device according to claim 1, wherein the timing is during automated driving or when stopping the vehicle after the end of automated driving.

4. The notification device according to claim 1, wherein the timing is before the start or at the time of start of automated driving when next running by automated driving on a road run on by automated driving for calculating the score.

5. A notification method by a notification device for notifying information to a driver of a vehicle through an output device, wherein the notification method comprises:

detecting behavior of the driver based on driver data expressing the state of the driver;

calculating a score showing a degree by which the driver is relaxing based on the behavior of the driver;

notifying the score, calculated based on behavior of the driver during automated driving by which driving operations of the vehicle are automatically performed, through the output device when a predetermined timing is reached;

not notifying the score when a predetermined condition stands even when the timing is reached, wherein the predetermined condition is that the score be higher than a predetermined notification upper limit value.

6. A nontransitory recording medium provided with a computer program for a notification device comprising a display or a speaker for notifying information to a driver of a vehicle through an output device, the nontransitory recording medium provided with a computer program for a notification device making the notification device:

detect behavior of the driver based on driver data expressing the state of the driver;

calculate a score showing a degree by which the driver is relaxing based on the behavior of the driver;

notify the score, calculated based on behavior of the driver during automated driving by which driving operations of the vehicle are automatically performed, through the output device when a predetermined timing is reached; and not notify the score when a predetermined condition stands even when the timing is reached, wherein the predetermined condition is that the score be higher than a predetermined notification upper limit value.

* * * * *